W. BOWDEN.
Machines for Upsetting Tires
No. 151,467.  Patented June 2, 1874.
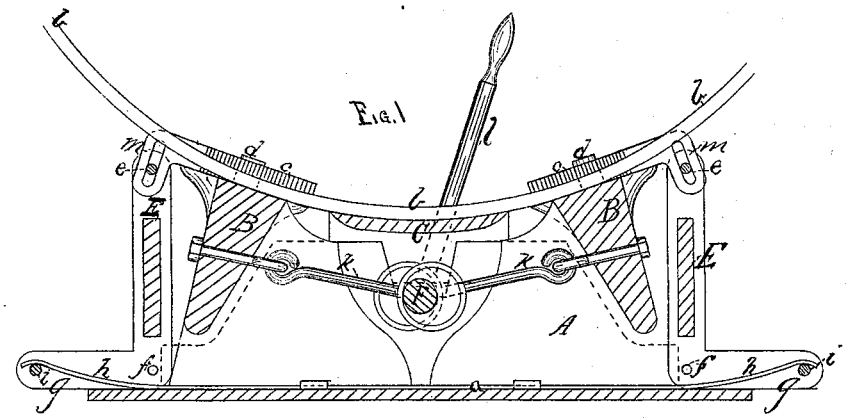
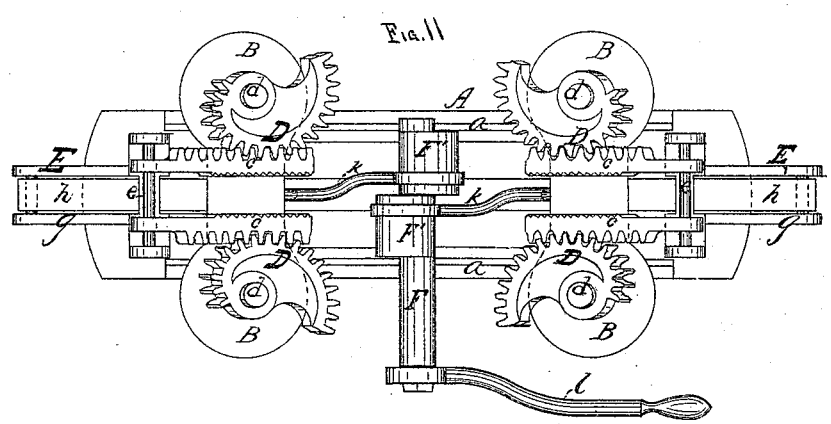
WITNESSES.
C. N. Woodward.
T. H. Parsons.
William Bowden,
INVENTOR, By
Burke, Fraser & Co
Attys.

UNITED STATES PATENT OFFICE.

WILLIAM BOWDEN, OF HAMBURG, NEW YORK.

IMPROVEMENT IN MACHINES FOR UPSETTING TIRES.

Specification forming part of Letters Patent No. 151,467, dated June 2, 1874; application filed March 31, 1874.

*To all whom it may concern:*

Be it known that I, WILLIAM BOWDEN, of Hamburg, in the county of Erie and State of New York, have invented certain Improvements in Tire-Upsetters, of which the following is a specification:

The invention relates to a portable self-adjusting tire-upsetter; and the invention consists in the arrangement and operation of the parts, as hereinafter explained.

In the drawings, Figure 1 is a sectional side elevation; Fig. 2, a plan.

A represents the cast-iron bed or frame, with grooves *a a*, in which slide the clamp-tables B B, one at each end of the machine. C is the central stationary bed on which the red-hot tire *b* rests, the other adjacent parts of said tire being held by serrated clamps or jaws *c c*, two working on each table B. The outside of said clamps *c c* are provided with cogs, which mesh into corresponding cogs in eccentrics D D, set on steel pins *d*, said eccentrics moving on the table B, as shown. The other ends of the clamps *c c* are provided with slots *m*, through which a rod or shaft, *e*, passes. The slots *m* allow the necessary play to the clamps. This rod *e* is set into the upright parts of an end piece, E, which swings forward and back on pivots or pins *f f* at the base of the machine, the lower part *g* of the end piece standing out at right angles to the upright part, as shown in Fig. 1. *h* is a long spring, the end resting on a rod, *i*, in the outer part of the end piece *g*, (see Fig. 1,) the object of this to be presently explained.

The construction of the tables B, clamps *c c*, eccentrics D D, end piece E *g*, &c., is precisely the same at both ends of the machine. Through the center of the frame A, at right angles, runs an operating-shaft, F, having double eccentrics F' F' just under the stationary bed-piece C. (See Fig. 2.) Around these eccentrics work eccentric rods *k k*, their ends connected to the sliding tables B B.

A lever or crank, *l*, is attached to the shaft F, to operate the whole as follows: The tire B is heated at its thinnest or weakest point, and that part set on the central bed-piece C, while the contiguous parts of the tire rest on the slanting movable tables B B, and between the serrated clamps *c c*, as shown in Fig. 1. The shaft F is then given an eighth or quarter turn by means of the lever-handle *l*. This operates the eccentrics on said shaft, the rods or links *k k* drawing the tables toward the center, and, as they move, at the same time giving a self-action to the cogged eccentrics D D on top of said tables, which operate at once on the clamps *c c*, making them bite the edges of the tire. When these have taken hold all they can, the two opposite end pieces E move forward on their pivots *f f* to a sufficient distance, or as far as the tables B carry them, until released by the action of the lever *l*. This holds the tire firmly, and also forces it together, or upsetting it, as it is called. The springs *h h* give that necessary amount of resistance or pull-back to the clamps *c c* to make them hold, and also throws the end piece E back into place when the lever is released.

These machines will do any kind of upsetting as well as on tires, and can be adjusted to any size of tires, &c., from one quarter to, say, five inches wide. It does away with all and any wedges, which are apt to break the machine.

I claim—

1. The swinging end piece E *g*, pivoted at *f f*, the springs *h h*, and the serrated and cogged clamps or tire-holders *c c*, with slotted ends, working on rod *e* in said pieces, all combined to operate as and for the purpose specified.

2. The sliding clamp-tables B B, operated by the double eccentric shaft F F' and rods *k k*, and the cogged eccentrics D D, moving on pins *d d*, and working in connection with the tire-holders *c c*, by means of the corresponding cogs, all combined as herein shown, for the object specified.

3. The frame A, bed piece C, sliding table B B, with eccentrics D D, the swinging end pieces E *g*, spring *h*, tire-holders *c c*, and double eccentric shaft F F', and links *k k*, all combined and constructed to operate as hereinbefore set forth.

In witness whereof I have hereunto signed my name in the presence of two subscribing witnesses.

WM. BOWDEN.

Witnesses:
 J. R. DRAKE,
 T. H. PARSONS.